(12) United States Patent
Chen et al.

(10) Patent No.: US 7,678,732 B2
(45) Date of Patent: Mar. 16, 2010

(54) HIGHLY ACTIVE SLURRY CATALYST COMPOSITION

(75) Inventors: Kaidong Chen, Albany, CA (US); Bruce E. Reynolds, Martinez, CA (US); Darush Farshid, Larkspur, CA (US)

(73) Assignee: Chevron USA Inc., San Ramon, CA (US)

( * ) Notice: Subject to any disclaimer, the term of this patent is extended or adjusted under 35 U.S.C. 154(b) by 0 days.

(21) Appl. No.: 12/212,483

(22) Filed: Sep. 17, 2008

(65) Prior Publication Data

US 2009/0011931 A1 Jan. 8, 2009

Related U.S. Application Data (63) Continuation-in-part of application No. 11/931,972, filed on Oct. 31, 2007, and a continuation-in-part of application No. 12/168,687, filed on Jul. 7, 2008, now abandoned, which is a continuation-in-part of application No. 11/627,593, filed on Jan. 26, 2007, now Pat. No. 7,396,799, which is a continuation-in-part of application No. 10/938,003, filed on Sep. 10, 2004, now abandoned.

(51) Int. Cl.
*B01J 27/051* (2006.01)
(52) U.S. Cl. .................................... 502/220
(58) Field of Classification Search ........... None
See application file for complete search history.

(56) References Cited

U.S. PATENT DOCUMENTS

| | | | |
|---|---|---|---|
| 3,817,856 A | 6/1974 | Aaron et al. | |
| 4,162,959 A * | 7/1979 | Duraiswamy | 208/411 |
| 4,485,004 A | 11/1984 | Fisher et al. | |
| 4,592,827 A | 6/1986 | Galiasso et al. | |
| 4,684,456 A | 8/1987 | Van Driesen et al. | |
| 4,710,486 A | 12/1987 | Lopez et al. | |
| 4,824,821 A | 4/1989 | Lopez et al. | |
| 4,912,071 A * | 3/1990 | Kaijima et al. | 502/26 |
| 4,943,547 A | 7/1990 | Seamans et al. | |
| 4,970,190 A | 11/1990 | Lopez et al. | |
| 5,039,392 A | 8/1991 | Bearden et al. | |
| 5,041,404 A | 8/1991 | Seamans et al. | |
| 5,162,282 A | 11/1992 | Lopez et al. | |
| 5,164,075 A | 11/1992 | Lopez et al. | |
| 5,178,749 A | 1/1993 | Lopez et al. | |
| 5,298,152 A | 3/1994 | Kramer et al. | |
| 5,371,308 A | 12/1994 | Gosselink et al. | |
| 5,374,348 A | 12/1994 | Sears et al. | |
| 5,484,755 A * | 1/1996 | Lopez | 502/219 |
| 5,527,473 A | 6/1996 | Ackerman | |
| 5,871,638 A | 2/1999 | Pradhan et al. | |
| 5,914,010 A | 6/1999 | Hood et al. | |
| 5,925,238 A | 7/1999 | Duddy et al. | |

(Continued)

*Primary Examiner*—Melvin C Mayes
*Assistant Examiner*—Stefanie Cohen (57) ABSTRACT

The instant invention is directed to the preparation of a slurry catalyst composition. The slurry catalyst composition is prepared in a series of steps, involving mixing a Group VIB metal oxide and aqueous ammonia to form an aqueous mixture and sulfiding the mixture to form a slurry. The slurry is then promoted with a Group VIII metal. Subsequent steps involve mixing the slurry with a hydrocarbon oil, and combining the resulting mixture with hydrogen gas (under conditions which maintain the water in a liquid phase) to produce the active slurry catalyst.

32 Claims, 5 Drawing Sheets

U.S. PATENT DOCUMENTS

| | | | |
|---|---|---|---|
| 5,935,418 A * | 8/1999 | Chakrabarty et al. | 208/108 |
| 5,954,945 A | 9/1999 | Cayton et al. | |
| 5,977,192 A | 11/1999 | Howsmon et al. | |
| 6,071,402 A | 6/2000 | Danot et al. | |
| 6,139,723 A | 10/2000 | Pelrine et al. | |
| 6,156,693 A | 12/2000 | Song et al. | |
| 6,156,695 A | 12/2000 | Soled et al. | |
| 6,162,350 A | 12/2000 | Soled et al. | |
| 6,190,542 B1 | 2/2001 | Comolli et al. | |
| 6,241,874 B1 | 6/2001 | Wallace et al. | |
| 6,270,654 B1 | 8/2001 | Colyar et al. | |
| 6,274,530 B1 | 8/2001 | Cayton et al. | |
| 6,277,895 B1 | 8/2001 | Zhou et al. | |
| 6,278,034 B1 | 8/2001 | Espinoza et al. | |
| 6,291,391 B1 | 9/2001 | MacArthur et al. | |
| 6,299,760 B1 | 10/2001 | Soled et al. | |
| 6,451,729 B1 | 9/2002 | Song et al. | |
| 6,534,437 B2 | 3/2003 | Eijsbouts et al. | |
| 6,554,994 B1 | 4/2003 | Reynolds et al. | |
| 6,620,313 B1 | 9/2003 | Demmin et al. | |
| 6,630,066 B2 | 10/2003 | Cash et al. | |
| 6,635,599 B1 | 10/2003 | Eijsbouts et al. | |
| 6,652,738 B2 | 11/2003 | Eijsbouts et al. | |
| 6,660,157 B2 | 12/2003 | Que et al. | |
| 6,712,955 B1 | 3/2004 | Hou et al. | |
| 6,726,832 B1 | 4/2004 | Baldassari et al. | |
| 6,758,963 B1 | 7/2004 | Hantzer et al. | |
| 7,413,669 B2 | 8/2006 | Gonzalez et al. | |
| 7,150,823 B2 | 12/2006 | Mayer et al. | |
| 7,179,366 B2 | 2/2007 | Harle et al. | |
| 7,214,308 B2 | 5/2007 | Colyar | |
| 7,223,713 B2 | 5/2007 | Alonso et al. | |
| 7,232,515 B1 | 6/2007 | Demmin et al. | |
| 7,297,250 B2 | 11/2007 | Bronicki | |
| 7,358,413 B2 | 4/2008 | Stell et al. | |
| 7,416,653 B2 | 8/2008 | Wellington et al. | |
| 2002/0010088 A1 | 1/2002 | Eijsbouts et al. | |
| 2002/0125172 A1 | 9/2002 | Que et al. | |
| 2002/0166797 A1 | 11/2002 | Banerjee | |
| 2003/0089636 A1 | 5/2003 | Marchionna et al. | |
| 2003/0102254 A1 | 6/2003 | Eijsbouts et al. | |
| 2003/0150778 A1 | 8/2003 | Haluska et al. | |
| 2004/0134837 A1 | 7/2004 | Dassori et al. | |
| 2004/0163999 A1 | 8/2004 | Plantenga et al. | |
| 2004/0226860 A1 | 11/2004 | Bourges et al. | |
| 2005/0040080 A1 | 2/2005 | Riley et al. | |
| 2005/0145538 A1 | 7/2005 | Wellington et al. | |
| 2005/0145543 A1 | 7/2005 | Bhan et al. | |
| 2005/0150818 A1 | 7/2005 | Bhan et al. | |
| 2005/0155908 A1 | 7/2005 | Bhan et al. | |
| 2005/0167320 A1 | 8/2005 | Bhan et al. | |
| 2005/0167321 A1 | 8/2005 | Wellington et al. | |
| 2005/0167322 A1 | 8/2005 | Wellington et al. | |
| 2005/0167323 A1 | 8/2005 | Wellington et al. | |
| 2005/0167324 A1 | 8/2005 | Bhan et al. | |
| 2005/0167326 A1 | 8/2005 | Bhan et al. | |
| 2005/0167327 A1 | 8/2005 | Bhan et al. | |
| 2005/0167328 A1 | 8/2005 | Bhan et al. | |
| 2005/0167329 A1 | 8/2005 | Bhan et al. | |
| 2005/0167330 A1 | 8/2005 | Bhan et al. | |
| 2005/0167331 A1 | 8/2005 | Bhan et al. | |
| 2005/0167332 A1 | 8/2005 | Bhan et al. | |
| 2005/0173298 A1 | 8/2005 | Wellington et al. | |
| 2005/0173301 A1 | 8/2005 | Bhan et al. | |
| 2005/0173302 A1 | 8/2005 | Bhan et al. | |
| 2005/0173303 A1 | 8/2005 | Bhan et al. | |
| 2005/0241992 A1 | 11/2005 | Lott et al. | |
| 2005/0241993 A1 | 11/2005 | Lott et al. | |
| 2006/0011511 A1 | 1/2006 | Hokari et al. | |
| 2006/0054535 A1 | 3/2006 | Chen et al. | |
| 2006/0060501 A1 | 3/2006 | Gauthier et al. | |
| 2006/0060502 A1 | 3/2006 | Soled et al. | |
| 2006/0060503 A1 | 3/2006 | Soled et al. | |
| 2006/0157385 A1 | 7/2006 | Montanari et al. | |
| 2006/0163115 A1 | 7/2006 | Montanari et al. | |
| 2006/0175229 A1 | 8/2006 | Montanari et al. | |
| 2006/0186021 A1 | 8/2006 | Montanari et al. | |
| 2006/0201854 A1 | 9/2006 | Lott | |
| 2006/0207917 A1 | 9/2006 | Domokos et al. | |
| 2006/0231465 A1 | 10/2006 | Bhan et al. | |
| 2006/0272982 A1 | 12/2006 | Montanari et al. | |
| 2006/0289340 A1 | 12/2006 | Brownscombe et al. | |
| 2007/0000808 A1 | 1/2007 | Bhan et al. | |
| 2007/0000810 A1 | 1/2007 | Bhan et al. | |
| 2007/0012595 A1 | 1/2007 | Brownscombe et al. | |
| 2007/0045156 A1 | 3/2007 | Khadzhiev et al. | |
| 2007/0084754 A1 | 4/2007 | Soled et al. | |
| 2007/0090023 A1 | 4/2007 | Soled et al. | |
| 2007/0090024 A1 | 4/2007 | Soled et al. | |
| 2007/0158236 A1 | 7/2007 | Zhou et al. | |
| 2007/0158238 A1 | 7/2007 | Wu et al. | |
| 2007/0161505 A1 | 7/2007 | Pereira-Almao et al. | |
| 2007/0238607 A1 | 10/2007 | Alonso et al. | |
| 2007/0284285 A1 | 12/2007 | Stepanik et al. | |
| 2007/0295641 A1 | 12/2007 | Brownscombe et al. | |
| 2007/0295645 A1 | 12/2007 | Brownscombe et al. | |
| 2007/0295646 A1 | 12/2007 | Bhan et al. | |
| 2007/0295647 A1 | 12/2007 | Brownscombe et al. | |
| 2008/0083650 A1 | 4/2008 | Bhan et al. | |
| 2008/0083652 A1 | 4/2008 | Morel et al. | |
| 2008/0083655 A1 | 4/2008 | Bhan et al. | |
| 2008/0085225 A1 | 4/2008 | Bhan et al. | |
| 2008/0087575 A1 | 4/2008 | Bhan et al. | |
| 2008/0087578 A1 | 4/2008 | Bhan et al. | |
| 2008/0099371 A1 | 5/2008 | McCoy et al. | |

* cited by examiner

HIGHLY ACTIVE SLURRY CATALYST COMPOSITION

CROSS REFERENCE TO RELATED APPLICATIONS

This application is a continuation-in-part of U.S. patent application Ser. No. 11/931,972 with a filing date of Oct. 31, 2007. It is also a continuation-in-part of U.S. patent application Ser. No. 12/168,687 with a filing date of Jul. 7, 2008, now abandoned, which is a continuation-in-part of U.S. patent application Ser. No. 11/627,593 with a filing date of Jan. 26, 2007 (U.S. Pat. No. 7,396,799), which is a continuation-in-part of abandoned U.S. patent application Ser. No. 10/938,003 with a filing date of Sep. 10, 2004 now abandoned, the disclosures of which are incorporated herein by reference.

TECHNICAL FIELD

The present invention relates to the preparation of slurry catalyst compositions useful in the processing of heavy oils. These oils are characterized by low hydrogen to carbon ratios and high carbon residues, asphaltenes, nitrogen, sulfur and metal contents.

BACKGROUND

Slurry catalyst compositions and means for their preparation are known in the refining arts. Some examples are discussed below.

U.S. Pat. No. 4,710,486 discloses a process for the preparation of a dispersed Group VIB metal sulfide hydrocarbon oil hydroprocessing catalyst. Process steps include reacting aqueous ammonia and a Group VIB metal compound, such as molybdenum oxide or tungsten oxide, to form a water soluble oxygen-containing compound such as ammonium molybdate or tungstate.

U.S. Pat. No. 4,970,190 discloses a process for the preparation of a dispersed Group VIB metal sulfide catalyst for use in hydrocarbon oil hydroprocessing. This catalyst is promoted with a Group VIII metal. Process steps include dissolving a Group VIB metal compound, such as molybdenum oxide or tungsten oxide, with ammonia to form a water soluble compound such as aqueous ammonium molybdate or ammonium tungstate.

U.S. Pat. Nos. 5,164,075 and 5,484,755 (the latter patent being incorporated by reference) disclose processes for preparation of high activity slurry catalysts for hydroprocessing heavy hydrocarbon oils produced from Group VIB metal compounds. An aqueous mixture of the metal compound is sulfided with from greater than about 8 to about 14 standard cubic feet of hydrogen sulfide per pound of Group VIB metal. These patents demonstrate a process of forming a slurry catalyst precursor and adding it to a heavy feed oil to form the active catalyst. These patents do not, however, demonstrate the criticality of the oil viscosity in the formation of a highly active catalyst composition, nor the significance of maintaining water in the liquid phase in a crucial reaction step.

In the inventions disclosed in U.S. Pat. Nos. 5,164,075 and 5,484,755, the failure to form the oil and water emulsion or the slurry phase results in an inactive catalyst or a catalyst having low activity.

This application discloses a new slurry catalyst composition that is highly active. This activity results from preparation of the catalyst using a process employing a single hydrocarbon oil (preferably a vacuum gas oil) having an appropriate viscosity range at 212° F.

SUMMARY OF THE INVENTION

In one aspect, this invention is directed to a highly active catalyst composition which is suitable for processing heavy hydrocarbon oils. The catalyst is prepared by the following steps, resulting in a catalyst composition suitable for the hydroconversion of heavy oils, which is prepared by: (a) mixing a Group VIB metal oxide and aqueous ammonia to form a Group VI metal compound aqueous mixture; (b) sulfiding, in an initial reactor, the aqueous mixture of step (a) with a gas comprising hydrogen sulfide to form a slurry; (c) promoting the slurry with a Group VIII metal compound; (d) mixing under turbulent mixing conditions the slurry of step (c) with hydrocarbon oil having a viscosity of at least 2 cSt (or 32.8 SSU) @ 212° F. to form Mixture X; (e) combining Mixture X with hydrogen gas in a second reaction zone, under conditions which maintain at least a portion of water in Mixture X in a liquid phase, thereby forming an active catalyst composition admixed with a liquid hydrocarbon; and optionally, (f) recovering the active catalyst composition.

In one embodiment, this new highly active slurry catalyst composition may be stored in an active and concentrated state. The catalyst composition can be directly introduced into any of the known heavy oil or residuum upgrading processes under the existing conditions of that process. The catalyst can upgrade the very high viscosity carbonaceous and/or highly paraffinic feedstocks with or without dilution of the feedstock.

DETAILED DESCRIPTION

The following terms will be used throughout the specification and will have the following meanings unless otherwise indicated.

SCF refers to a unit of standard cubic foot of gas ($N_2$, $H_2$, $H_2S$, etc.).

SCFB, or SCF/BBL (or scf/bbl) refers to a unit of standard cubic foot of gas ($N_2$, $H_2$, etc.) per barrel of hydrocarbon.

As used herein, "heavy hydrocarbon oils" refers to heavy and ultra-heavy crudes feed or feedstock, including but not limited to resids, coals, bitumen, tar sands, etc. Heavy oil feedstock may be liquid, semi-solid, and/or solid. Examples of heavy oil feedstock that might be upgraded as described herein include but are not limited to Canada Tar sands, vacuum resid from Brazilian Santos and Campos basins, Egyptian Gulf of Suez, Chad, Venezuelan Zulia, Malaysia, and Indonesia Sumatra. Other examples of heavy oil feedstock include residuum left over from refinery processes, including "bottom of the barrel" and "residuum" (or "resid")—atmospheric tower bottoms, which have a boiling point of at least 343° C. (650° F.), or vacuum tower bottoms, which have a boiling point of at least 524° C. (975° F.), or "resid pitch" and "vacuum residue"—which have a boiling point of 524° C. (975° F.) or greater.

As used herein, hydroprocessing is meant as any process that is carried out in the presence of hydrogen, including, but not limited to, hydroconversion, hydrocracking, hydrogenation, hydrotreating, hydrodesulfurization, hydrodenitrogenation, hydrodemetallation, hydrodearomatization, hydroisomerization, hydrodewaxing and hydrocracking including selective hydrocracking. The products of hydroprocessing may show improved viscosities, viscosity indices, saturates content, low temperature properties, volatilities and depolarization, etc.

As used herein, "highly active" means the catalyst when employed in a hydroprocessing process to process heavy oil feedstock gives a conversion rate of at least 95% in one embodiment, 97% in a second embodiment, and 98% in a third embodiment. As used herein, conversion rate refers to the conversion of heavy oil feedstock to less than 1000° F. (538° C.) boiling point materials. In yet another embodiment, "highly active" means the catalyst has a hydrodesulfurization (HDS) and/or hydrodenitrogenation (HDN) rate of at least 90%.

In one embodiment, the invention relates to a new highly active slurry catalyst composition formed from the combination of a slurry comprising Group VIB and Group VIII metal compounds and a hydrocarbon oil medium. In one embodiment, the hydrocarbon oil is selected from the group of diesel, vacuum gas oil (VGO), decant oil or cycle oil, and/light gas oil. In one embodiment, the hydrocarbon oil has a viscosity of at least 2 cSt (or 32.8 SSU) @ 212° F. In another embodiment, the preferred viscosity range for the hydrocarbon oil is from at least about 2 cSt (or 32.8 SSU) @ 212° F. to 15 cSt (or 77.9 SSU) @ 212° F.

In one embodiment, the invention relates to a new highly active slurry catalyst composition formed from the combination of a slurry comprising Group VIB and Group VIII metals and a hydrocarbon oil having a viscosity of at least 2 cSt (or 32.8 SSU) @ 212° F. The preferred viscosity range for the hydrocarbon oil is from at least about 2 cSt (or 32.8 SSU) @ 212° F. to 15 cSt (or 77.9 SSU) @ 212° F.

In one embodiment, the weight ratio of the Group VIII and Group VIB metal components to the hydrocarbon oil medium is in the range of 1:1 to 1:500. In another embodiment, in the range of 1:2 to 1:150. In a third embodiment, from 1:3 to 1:100. In a fourth embodiment, from 1:5 to 1:50. In a fifth embodiment, the group VIII to Group VIB ratio ranges from 1:7 to 1:20.

In one embodiment, the Group VIB metal compound is selected from molybdenum and/or tungsten components, e.g., alkali metal or ammonium metallates of molybdenum, (e.g., ammonium molybdate and also iso-, peroxo-, di-, tri-, tetra-, hepta-, octa-, or tetradecamolybdate), ammonium salts of phosphomolybdic acids, Mo—P heteropolyanion compounds, Wo—Si heteropolyanion compounds, W—P heteropolyanion compounds. W—Si heteropolyanion compounds, Ni—Mo—W heteropolyanion compounds. Co—Mo—W heteropolyanion compounds, alkali metal or ammonium tungstates (also meta-, para-, hexa-, or polytungstate), or mixtures thereof, added in the solute state such as water-soluble molybdenum and tungsten compounds.

In one embodiment, the Group VIB metal compound is selected from the group of molybdenum (di- and tri) oxide, molybdenum carbide, molybdenum nitride, aluminum molybdate, molybdic acid (e.g. $H_2MoO_4$), or mixtures thereof.

In one embodiment, the Group VIII metal compound is a Group VIII metal salt or mixtures selected from nitrates, hydrated nitrates, chlorides, hydrated chlorides, sulfates, hydrated sulfates, formates, acetates, hypophosphites, and mixtures thereof, added in a solute state Examples include water-soluble nickel and/or cobalt components, e.g. water-soluble nickel and/or cobalt salts such as nitrates, sulfates, acetates, chlorides, formates or mixtures thereof of nickel and/or cobalt as well as nickel hypophosphite.

Figure 1:
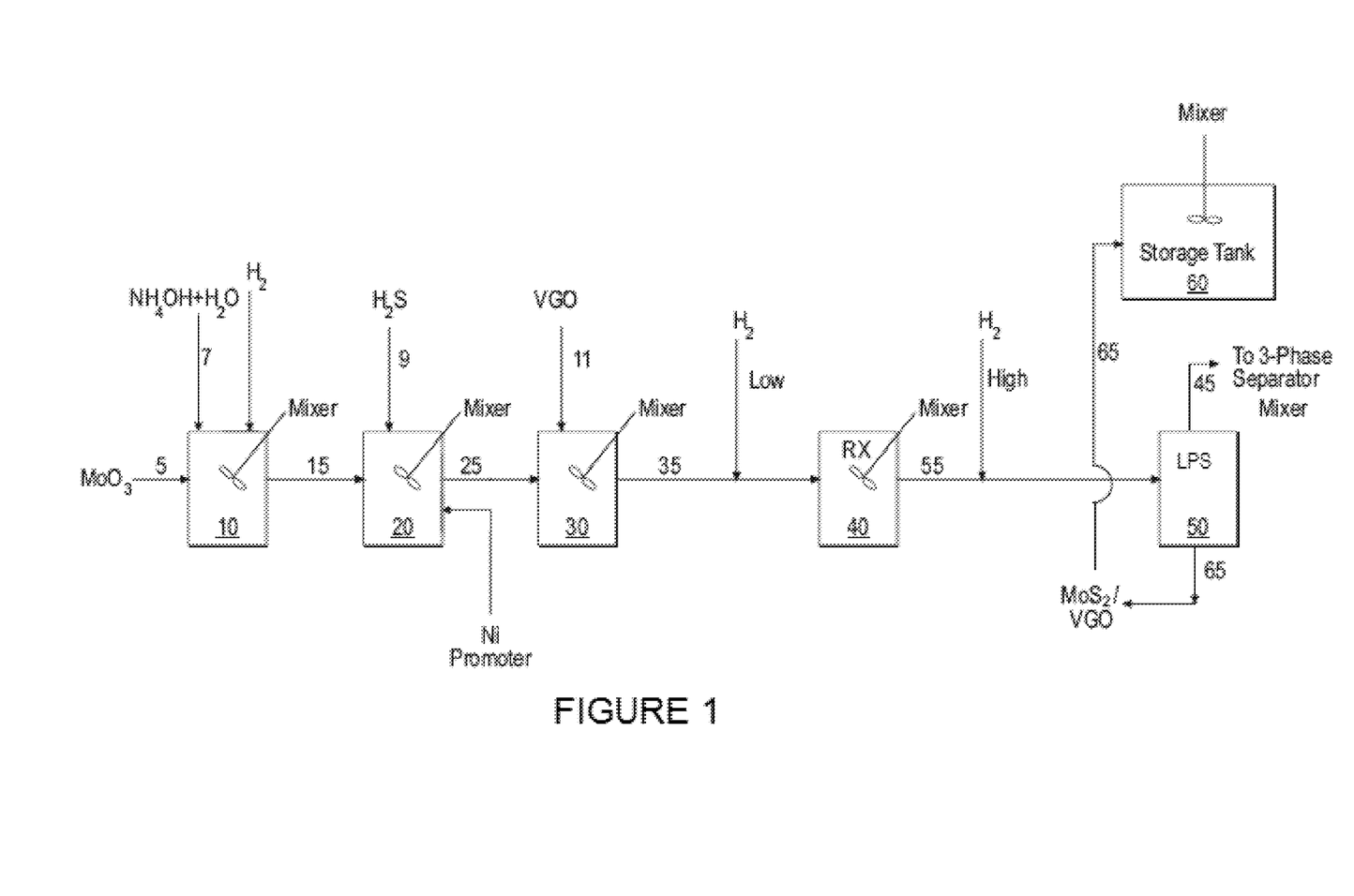
FIG. 1 illustrates the steps involved in one embodiment for the preparation of the catalyst composition.

FIG. 1 illustrates one embodiment of the steps involved in the process of this invention. The active slurry catalyst composition is prepared by mixing line 5, containing an oxide of Group VIB metal such as tungsten or molybdenum, and line 7, containing aqueous ammonia, in a mixing zone 10. The temperature of the mixing zone is generally in the range from about 80° F. to about 200° F., preferably from about 100° F. to about 150° F., and most preferably from about 110° F. to about 120° F. The pressure of the mixing zone 10 is generally from about atmospheric pressure to about 100 psig, preferably from about 5 psig to about 35 psig, and most preferably from about 10 psig to about 35 psig. The Group VIB metal oxide is dissolved in water containing the ammonia. The amount of ammonia added is based on the ratio of $NH_3$ to Group VIB oxide in lbs/lbs and generally ranges from 0.1 lbs/lbs to about 1.0 lbs/lbs, preferably from about 0.15 lbs/lbs to about 0.50 lbs/lbs, and most preferably from about 0.2 lbs/lbs to about 0.30 lbs/lbs. The dissolved metal oxide in aqueous ammonia is moved via line 15 to the first reaction zone.

In the sulfidation step, hydrogen sulfide (or a hydrogen sulfide containing gas) and hydrogen are introduced to reaction zone 20. The amount of hydrogen sulfide (line 9) added to the reaction zone 20 is based on the ratio of $H_2S$ to Group VIB metal oxide in SCF/lbs and generally ranges from 4.0 SCF/lbs to about 20 SCF/lbs, preferably from about 8.0 SCF/lbs to about 18 SCF/lbs, and most preferably from about 12 to 14 SCF/lbs. The reaction time in the first reaction zone ranges from about 1 hour to 10 hours, preferably from 3 hours to 8 hours, and most preferably from about 4 hours to 6 hour per pound of Group VIB metal oxide. Conditions include a temperature in the range from 80° F. to 200° F., preferably in the range from 100° F. to 180° F., and most preferably in the range from 130° F. to 160° F. Pressure is in the range from 100 to 3000 psig, preferably in the range from 200 to 1000 psig, and most preferably from 300 to 500 psig. The resultant slurry is the catalyst precursor in an aqueous slurry phase.

The resultant slurry is combined with a Group VIII metal compound such as Ni or Co, as disclosed in U.S. Pat. No. 5,484,755. In one embodiment as an enhancement of the denitrogenation activity of the active slurry catalyst of the present invention, it is preferred that a Group VIII metal compound be added to the slurry before mixing the slurry with feed oil and a hydrogen containing gas at elevated temperature and pressure. Such Group VIII metals are exemplified by nickel and cobalt. It is preferred that the weight ratio of nickel or cobalt to molybdenum range from about 1:100 to about 1:2. It is most preferred that the weight ratio of nickel to molybdenum range from about 1:25 to 1:10, i.e., promoter/molybdenum of 4-10 weight percent. The Group VIII metal, exemplified by nickel, is normally added in the form of the sulfate, and preferably added to the slurry after sulfiding at a pH of about 10 or below and preferably at a pH of about 8 or below. Group VIII metal nitrates, carbonates or other compounds may also be used. In view of the high activity of the slurry catalyst of the present invention, the further promotion by Group VIII metal compounds is very advantageous.

The slurry containing the Group VIII metal promoter is moved, via line 25, to mixing zone 30. Mixing zone 30 employs an inert atmosphere which can comprise nitrogen, refinery gas, or any other gas having little or no oxygen. The slurry and at least a hydrocarbon oil diluent (line 11), such as VGO, are mixed continuously in a turbulent mixing condition, e.g., at a high shear mode to maintain a homogeneous slurry in mixer 30. High shear mixing encompasses a range from 100 to 1600 RPM. Preferably the mixing rate is greater than 500 RPM and most preferably greater than 1500 RPM.

The mixing can be done within a continuous stirred tank 30 as shown, or it can be done by other means including an in-line static mixer (e.g., with a plurality of internal baffles or other elements), a dynamic high-shear mixer (vessel with propeller for very high turbulent, high shear mixing), or a combination of the above for turbulent mixing condition.

As used herein, turbulent mixing conditions means sufficient mixing for a flow with a Reynolds number of at least 2000. In a second embodiment, turbulent mixing means sufficient mixing for a Reynolds number of at least 3000. In a third embodiment, a Reynolds number ranging from 3200 to 7200.

In one embodiment, the hydrocarbon oil diluent has a kinetic viscosity of at least 2 cSt (32.8 SSU) @ 212° F. In some embodiments, the kinetic viscosity can generally range from about 2 cSt (32.8 SSU) @ 212° F. to about 15 cSt (77.9 SSU) @ 212° F., preferably from about 4 cSt (39.5 SSU) @ 212° F. to about 10 cSt (59.2 SSU) @ 212° F., and most preferably from about 5 cSt (42.7 SSU) @ 212° F. to about 8 cSt (52.4 SSU) @ 212° F. The hydrocarbon oil causes the initial transformation of the catalyst precursor to an oil base from a water base.

In one embodiment, the ratio of Group VIB metal oxide to oil is at least less than 1.0, preferably less than 0.5, and more preferably less than 0.1. In one embodiment, if the kinetic viscosity of the oil is below about 2 cSt (32.8 SSU) @ 212° F. or above about 15 cSt (77.9 SSU) @ 212° F., the first transformation of the catalyst precursor may result in catalyst particles agglomerating or otherwise not mixing. This mixture is known in the claims as Mixture X.

The material from mixing zone 30 (Mixture X) moves to reaction zone 40 via line 35 wherein the catalyst precursor is transformed into an oil-based catalyst ("transformation step"). Hydrogen is continuously added to the mixture reaction zone 40, and high shear mixing is employed in the reaction zone 40 in order to maintain a homogenous slurry. The process conditions of reactor 40 are critical to forming the final catalyst in terms that at least a portion of the water is in the liquid. In one embodiment, "a portion of the water" means that at least 50% of the water in the mixture is maintained in a liquid phase. In a second embodiment, "a portion of the water" means that less than 90% of the water in the mixture is maintained in the liquid phase. In a third embodiment, less than 70% of the water in the mixture is maintained in the liquid phase. In a fourth embodiment, less than 50% of the water in the mixture is maintained in the liquid phase.

The temperature of the reaction zone 40 generally ranges from about 300° F. to 600° F., preferably from about 350° F. to about 500° F., and most preferably from about 350° F. to about 450° F. The pressure of the reaction zone 40 generally ranges from about 100 psig to about 3000 psig, preferably from about 200 psig to about 1000 psig, and most preferably from about 300 psig to about 500 psig. The hydrogen flow to the reaction zone 40 generally ranges from about 300 SCFB to about 2000 SCFB, preferably from about 300 SCFB to about 1000 SCFB, and most preferably from about 300 SCFB to about 500 SCFB. The reaction time in the reaction zone 40 ranges from about 10 minutes to 5 hours, preferably from 30 minutes to 3 hours, and most preferably from about 1 hour to 1.5 hours. The resultant slurry mixture is the active catalyst composition in admixture with the hydrocarbon oil.

The resultant slurry mixture can go directly to a hydroprocessing reactor without the need for water removal, but the presence of water will take up unnecessary room in a hydroprocessing reactor. In one embodiment, the slurry mixture is passed, through line 55, to separator 50 to remove water from the slurry catalyst prior to entering a hydroprocessing reactor. Hydrogen may be added following reactor 40, or directly into the separator 50 to flash off water and residual $H_2S$ in the catalyst slurry. The addition of hydrogen helps change water from liquid to vapor phase, permitting separation from oil slurry in a low pressure separator.

In one embodiment, the separator operates in a range from 300° F. to 700° F. Gases including $H_2S$ and water are removed overhead through line 45 and passed to a three phase separator (or to low pressure sour gas in one embodiment). The active catalyst composition is moved through line 65 to storage tank 60. The active catalyst composition is continuously mixed in storage tank 60 to maintain a homogenous slurry in a hydrogen atmosphere with little or no oxygen. In this way, the catalyst activity and stability are maintained.

The catalyst composition is useful for upgrading carbonaceous feedstocks which include atmospheric gas oils, vacuum gas oils, deasphalted oils, olefins, oils derived from tar sands or bitumen, oils derived from coal, heavy crude oils, synthetic oils from Fischer-Tropsch processes, and oils derived from recycled oil wastes and polymers. The catalyst composition is useful for but not limited to hydrogenation upgrading processes such as thermal hydrocracking, hydrotreating, hydrodesulphurization, hydrodenitrification, and hydrodemetallization.

In one embodiment, the catalyst composition comprises slurry catalyst in the hydrocarbon oil diluent with an average particle size of at least 1 micron. In another embodiment, the catalyst composition comprises slurry catalyst having an average particle size in the range of 1-20 microns. In yet another embodiment, the catalyst composition comprises catalyst molecules and/or extremely small particles that are colloidal in size (i.e., less than 100 nm, less than about 10 nm, less than about 5 nm, and less than about 1 nm), which in a hydrocarbon oil, forming a slurry catalyst having "clusters" of the colloidal particles, with the clusters having an average particle size in the range of 1-20 microns. In a fourth embodiment, the catalyst composition comprises a slurry catalyst having an average particle size in the range of 2-10 microns. In another embodiment, the composition comprises a slurry catalyst having an average particle size ranging from colloidal (nanometer size) to about 1-2 microns. In one embodiment, the catalyst composition comprises single layer $MoS_2$ clusters of nanometer sizes, e.g., 5-10 nm on edge.

As illustrated, the process steps are carried out sequentially in a number of tanks (reactors). In another embodiment, some of the steps are carried sequentially, and some are combined. Additionally, any of the process steps can be carried out in batch or continuous mode, or a mixture of batch and continuous modes. For example, the mixing step in tank 10, the sulfidation of the Group VIB catalyst precipitate/precursor, and subsequent promotion with Group VIII metal in tank 20 can be done in batch. The mixing step in tank 30, the transformation step in tank 40, and the separation step can be done in either continuous or batch mode.

Figure 2:
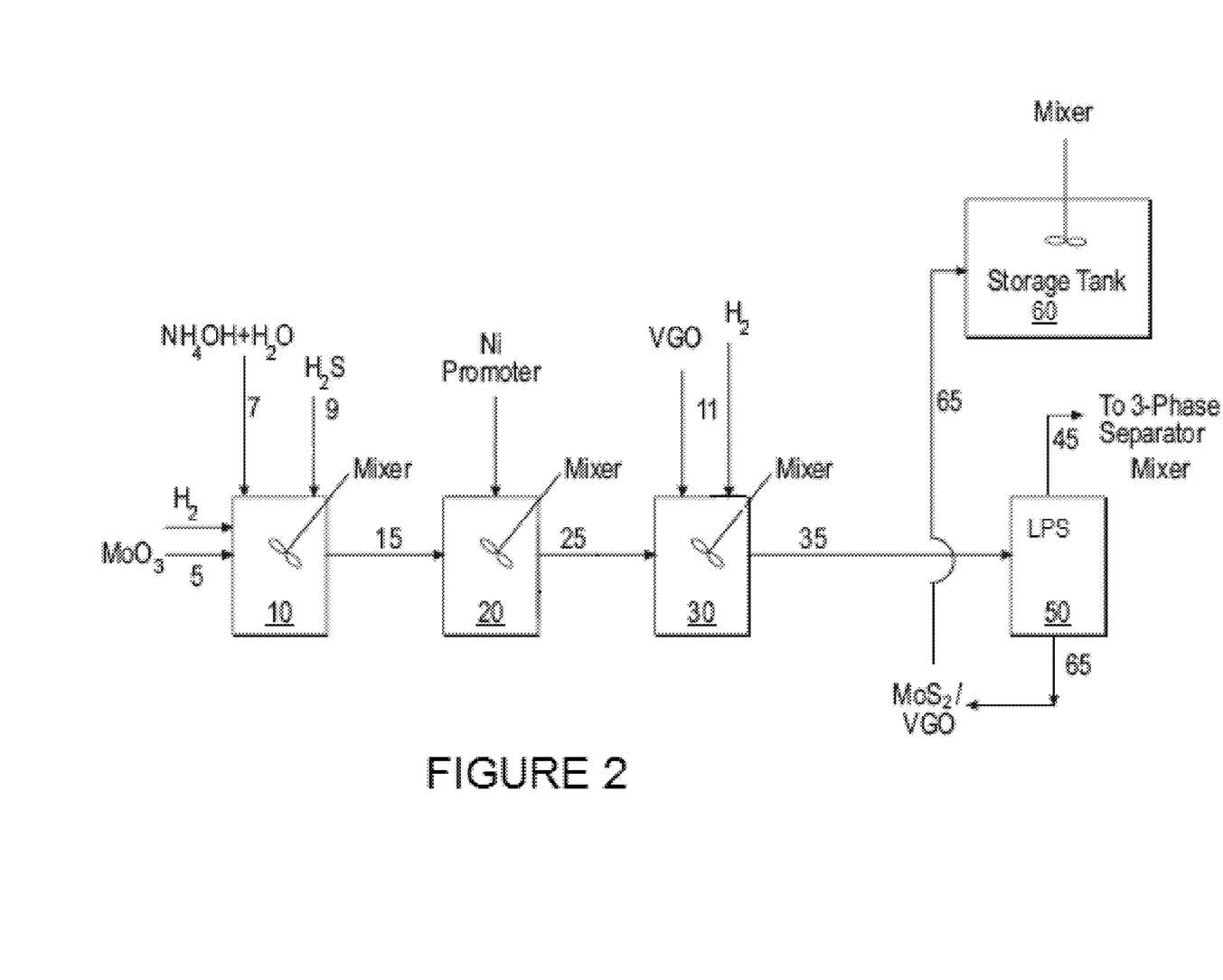
FIG. 2 illustrates another embodiment for the preparation of a catalyst composition, wherein the forming of a group VIII catalyst precursor precipitate in aqueous solution and the sulfidation steps are carried out in a single tank.

FIG. 2 illustrates another embodiment of the invention. After aqueous ammonia 7 is added to tank 10 to dissolve MoO₃ feed, hydrogen and H₂S containing gas (stream 9) are added to tank 10 for the sulfidation step, forming a Group VIB slurry catalyst precursor. In tank 20, a nickel compound is added to the slurry catalyst precursor as a promoter. Following the promotion step, a hydrocarbon oil diluent such as VGO, diesel, etc., or the like, is added and mixed into the slurry catalyst precursor to transform the mixture into a highly active catalyst in mixing tank 30, wherein continuous/high shear mixing is maintained for a homogeneous slurry. In one embodiment as illustrated, hydrogen is optionally added to mixing tank 30 in the transformation step. The condition of tank 30 is maintained at a sufficient pressure and temperature to keep at least a portion of the mixture in the liquid phase.

Figure 3:
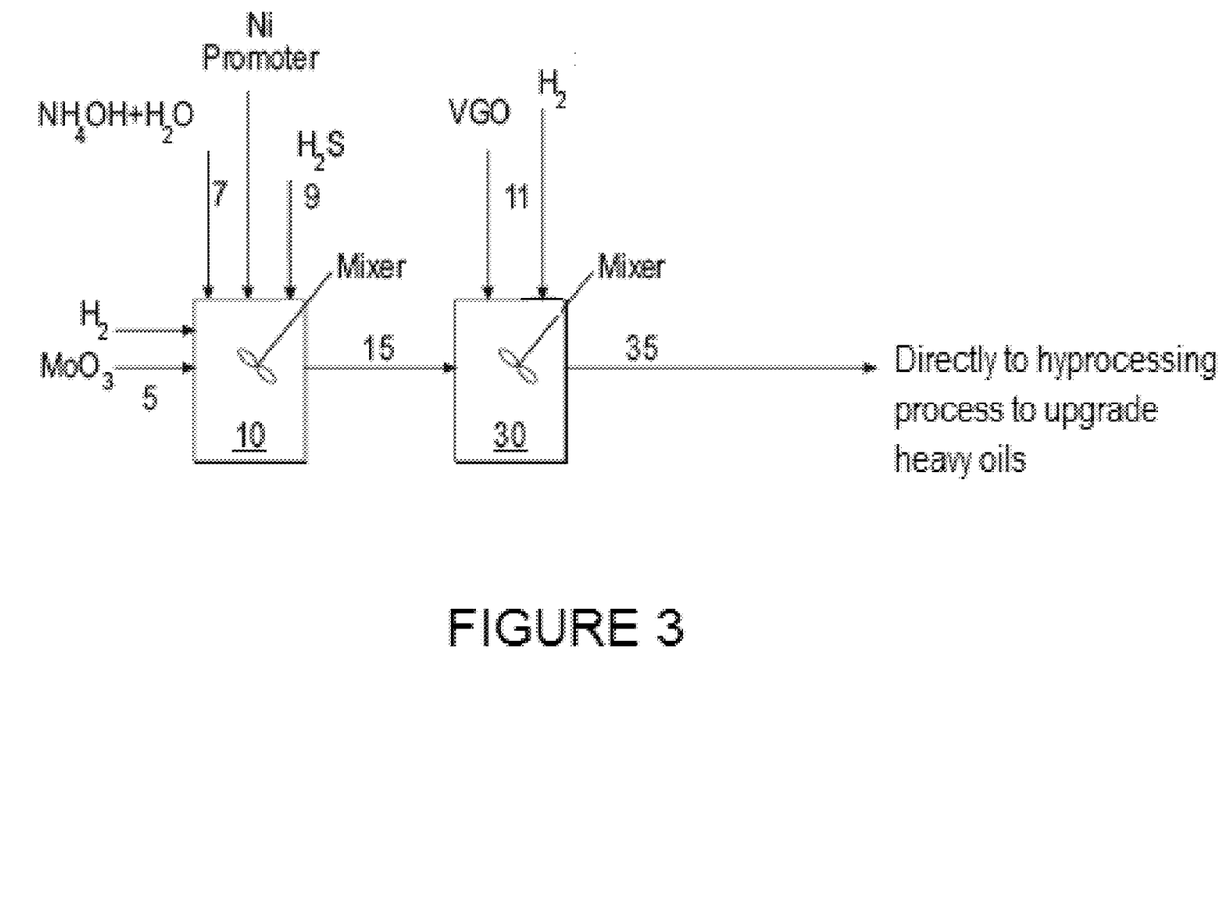
FIG. 3 illustrates a third embodiment for the preparation of a catalyst composition, wherein the sulfidation step and the promotion step with a group VIII metal are carried out concurrently.

FIG. 3 yet illustrates another embodiment whether the promotion step is carried out concurrently with other steps. After the addition of aqueous ammonia 7 to dissolve MoO₃, a nickel promoter is added to tank 10 along with hydrogen, and H₂S gas stream 9 to form a slurry catalyst precursor promoted with a Group VIII metal. In the next mixing tank 30, the catalyst precursor is transformed into an oil-soluble, highly active catalyst. As illustrated, the highly active catalyst is taken directly to a hydroprocessing reactor to upgrade heavy oils, or optionally sent to a separator (not shown) to remove water and ammonia, then to a storage tank for subsequent use in the hydroprocessing of heavy oils.

Figure 4:
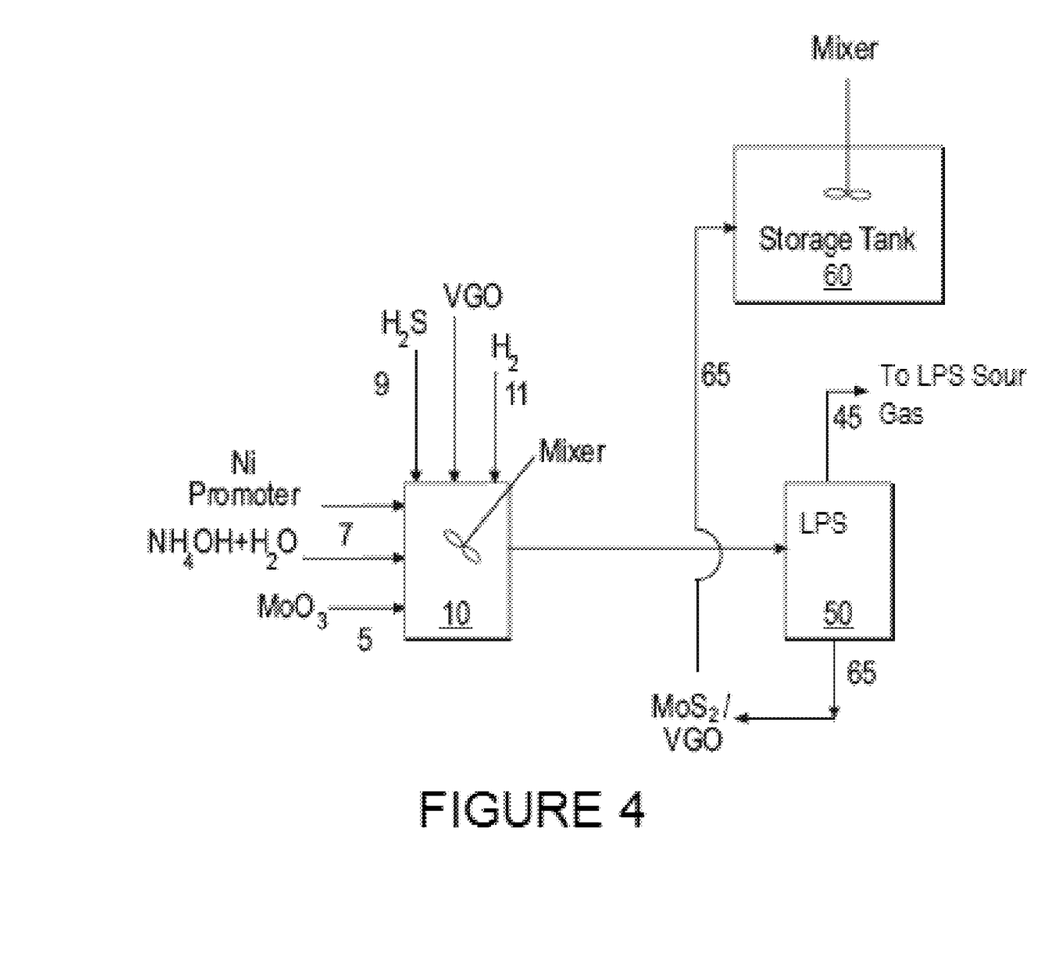
FIG. 4 illustrates a fourth embodiment for the preparation of a catalyst composition, wherein the catalyst preparation process is carried out in a single tank, and water removal is carried out in a separator.

In one embodiment as illustrated in FIG. 4, the process steps are carried out sequentially in one single tank 10 to simplify the catalyst production. In the single tank production, MoO₃ is first mixed with aqueous ammonia to form an aqueous mixture, then H₂ and H₂S are added to the mixture to form a slurry catalyst precursor. In the next step, a group VIII metal compound, e.g., a Ni promoter such as nickel nitrate, is added to the slurry catalyst precursor at a molar ratio of 9:1-1:9 (Group VIB metal to Promoter Group VIII Metal).

In one embodiment, the sulfidation step is combined into the step of forming the Group VIB metal compound precipitate, i.e., aqueous ammonia is added to tank 10 along with MoO₃ to dissolve the molybdenum compound, and then H₂S (or H₂S containing) and H₂ gases are added together or as separate streams to tank 10, forming a slurry catalyst precursor. In the next step, the slurry catalyst precursor is promoted with a group VIII metal compound.

In yet another embodiment, the Group VIII metal promotion is done concurrently with other steps, the sulfidation step. First, a group VIII metal compound is added to tank 10 along with aqueous ammonia to dissolve the molybdenum compound. In the next step, a Group VIII metal compound is added to tank 10 along with H₂S and H₂ gases, thus forming a slurry catalyst precursor promoted with a Group VIII metal.

In the final step and in the same tank 10, a hydrocarbon oil diluent such as VGO, diesel, etc., or the like, is added and mixed into the slurry catalyst precursor to transform the mixture into a highly active catalyst. In one embodiment, the mixing is continuous in a high shear mode, e.g., from 100 to 1600 RPM, and from about 10 minutes to 24 hours, forming a homogeneous slurry. In another embodiment, the transformation (reaction) ranges from 30 minutes to 3 hours. In a third embodiment, the transformation time ranges from 1 to 2 hrs. The process conditions in this transformation step are maintained at a sufficient pressure and temperature to keep at least a portion of the mixture in the liquid phase, i.e., at a temperature of 300-600 F, and a pressure from 100-3000 psig, with a hydrogen flow of 300-2000 SCFB.

In one embodiment, the transformation step in tank 10 is carried out under an inert atmosphere comprising any of nitrogen, refinery gas, a gas having little or no oxygen, and mixtures thereof. In another embodiment, the mixing is under a H₂-containing gas pressure. In yet another embodiment, hydrogen gas is added before and after the reactor in which the transformation takes place.

In one embodiment, the H₂ flow to the transformation step is kept at 100 to 2000 SCFB ("Standard Cubic Feet per Barrel" of hydrocarbon compound feed to the reactor). In a second embodiment, the H₂ flow ranges from 300 to 1000 SCFB. In yet another embodiment and after the transformation step, residual water and/or H₂S are first removed from the catalyst. In this step, H₂ flow to tank 10 is ramped up at a rate from 2-20 times the H₂ flow rate during the transformation step. Additionally, the pressure of tank 10 is ramped down from the transformation pressure (100-3000 psig) to about 10 psig in a period of 30 minutes to 6 hours. After the removal of water and H₂S, the catalyst can be sent to storage tank 60 or directly to a hydroprocessing reactor.

In one embodiment, besides the removal of residual water and H₂S, ammonia removal from the oil based catalyst can be carried out after the transformation step. The catalyst stream in one embodiment is heated prior to depressurization and ammonia vaporization, and then taken directly to a hydroprocessing reactor.

Figure 5:
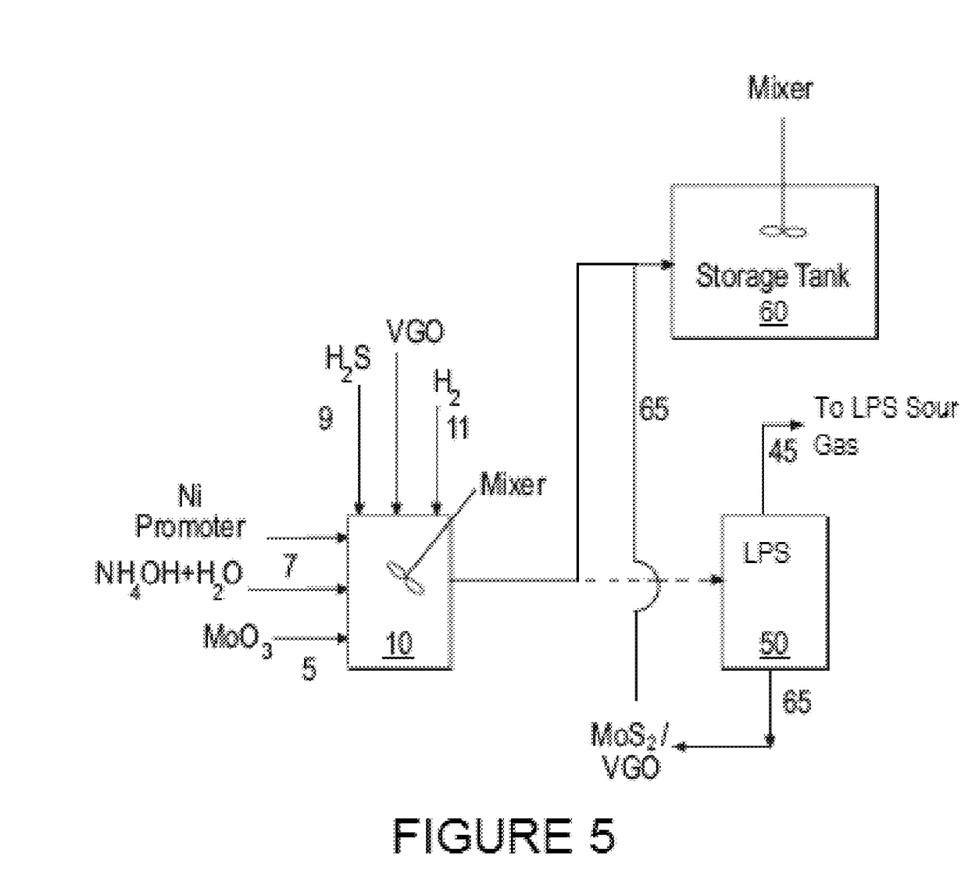
FIG. 5 illustrates yet another embodiment, wherein the removal of water from the catalyst is carried out in the same tank as the catalyst preparation steps.

In another embodiment, the oil based highly active catalyst from tank 10 is taken to a low pressure separator, or a plurality of low pressure separators 50 in series to remove residual water and H₂S from the catalyst prior to going to storage tank 60.

EXAMPLES

Example 1

Catalyst Preparation 540 gram MoO₃ is mixed with 79 gram of NH₃ and 2381 gram of H₂O to form a solution of total 3000 gram. The solution is then reacted with 10.71 SCF of H₂S by passing a gas mixture of 20% H₂S in H₂ into the solution under strong mixing. The reactor temperature is 150° F. and the total pressure is 400 psig, and the reaction time is 4 hours. After reaction, 460 gram NiSO₄ solution which contains 36 gram of Ni is added to the above obtained slurry. The obtained slurry mixture is then mixed with 8000 gram of vacuum gas oil at 100° F. The viscosity of the VGO is 5 cSt @ 212° F. The resulting mixture is then pumped into a continuously flow tanked reactor (perfectly mixed flow reactor) with H₂. The H₂ gas rate is 300 SCF/B. The reactor pressure is 400 psig and reactor temperature is 400° F., the total reaction time is 1 hour. The reaction products are mixed with more H₂ at a gas rate of 1500 SCF/B and then go to a separator, which is also maintained at a pressure of 400 psig, with temperature 500° F. to separate gas and liquid slurry. The obtained liquid slurry contains the highly active catalyst component.

In the catalyst preparation process, intensive mixing with Chemineer mixing number 8. Chemineer is a scale for agitation of solids in suspension, wherein high shear mixing is defined as intense mixing at a Chemineer of 4 or greater.

Example 2

Comparative Example According to U.S. Pat. No. 5,484,755

A catalyst/catalyst precursor is prepared using the method described in U.S. Pat. No. 5,484,755 (the Lopez Patent), with the same reagents as in Example 1, i.e., $MoO_3$, aqueous ammonia, $H_2S$ as the sulfiding agent (with S to Mo atomic ratio of 3.2 to 1 as in Example 1), and $NiSO_4$ as the promoter (as 10 wt. % of Mo, same as with Example 1).

The difference between Examples 1 and 2 is that in Example 2, there is no transformation step for the catalyst/catalyst precursor to be mixed with a hydrocarbon diluent, e.g., VGO oil at a high temperature and pressure, and thus transformed into a highly active catalyst.

Example 3

Comparing HDN and HDS Activities Using Catalysts of Examples 1 & 2

The catalysts prepared in Examples 1 and 2 are used for testing catalyst hydrogenation of a highly aromatic FCC cycle oil using a batch reactor having the following reaction conditions: 725° F. reaction temperature; an $H_2$ feed equivalent to 3000 SCFB hydrogen to oil ratio; 1250 psi $H_2$ partial pressure; 4 hours reaction time at reaction temperature; and a catalyst to oil ratio equal to about 2 wt. % by weight of oil feed. The results are as follows:

|  | Feed | Example 1 catalyst | Example 2 catalyst |
| --- | --- | --- | --- |
| Nitrogen ppm | 1670 | 143 | 380 |
| HDN conversion % | — | 91.4 | 77.2 |
| Sulfur ppm | 9850 | 776 | 1267 |
| HDS conversion % | — | 91.9 | 86.7 |
| API gravity | 7.7 | 16.5 | 14.1 |

Example 4

Catalyst Preparation—Single Tank

Into a continuously stirred reactor (CSTR), 540 gram $MoO_3$ is mixed with 79 gram of $NH_3$ and 2381 gram of $H_2O$ to form a solution of total 3000 gram. In the next step, the reactor is pressurized to 400 psig and heated to 150° F. In the same reactor, sulfidation takes place by mixing the solution with 10.71 SCF of $H_2S$ (by passing a gas mixture of 20% $H_2S$ in $H_2$) into the solution and still under strong mixing. After reaction, 460 gram $NiSO_4$ solution which contains 36 gram of Ni is added to the same CSTR to obtain a slurry. 8000 gram of vacuum gas oil at 100° F. is added to the slurry and mixed under high shear mixing. $H_2$ is added to tank at a rate of 300 SCF/B, and tank is next heated to 400° F. at a rate of 50° F./hour.

After the transformation step, the reactor is depressurized to about 10 psig over two hours to boil off the residual water and flash off any $H_2S$.

For the purpose of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained and/or the precision of an instrument for measuring the value, thus including the standard deviation of error for the device or method being employed to determine the value. The use of the term "or" in the claims is used to mean "and/or" unless explicitly indicated to refer to alternatives only or the alternative are mutually exclusive, although the disclosure supports a definition that refers to only alternatives and "and/or." The use of the word "a" or "an" when used in conjunction with the term "comprising" in the claims and/or the specification may mean "one," but it is also consistent with the meaning of "one or more," "at least one," and "one or more than one." Furthermore, all ranges disclosed herein are inclusive of the endpoints and are independently combinable. In general, unless otherwise indicated, singular elements may be in the plural and vice versa with no loss of generality. As used herein, the term "include" and its grammatical variants are intended to be non-limiting, such that recitation of items in a list is not to the exclusion of other like items that can be substituted or added to the listed items.

It is contemplated that any aspect of the invention discussed in the context of one embodiment of the invention may be implemented or applied with respect to any other embodiment of the invention. Likewise, any composition of the invention may be the result or may be used in any method or process of the invention. This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for preparing a catalyst composition suitable for the hydroconversion of heavy oils, comprising:(a) mixing a group VIB metal compound and aqueous ammonia to form a group VIB metal mixture in solution;(b) sulfiding the aqueous mixture of step (a) with a gas comprising hydrogen sulfide to form a slurry;(c) promoting the slurry with a Group VIII metal compound;(d) mixing under turbulent mixing conditions the slurry of step (c) with at least a hydrocarbon oil having a viscosity of at least 2 cSt @ 212° F. to form a homogenous slurry, and under sufficient temperature and pressure to maintain at least a portion of water in the slurry in a liquid phase, thereby forming an active catalyst composition admixed with a liquid hydrocarbon comprising slurry catalyst having an average particle size in the range of 1-20 microns.

2. The process of claim 1, wherein the sulfiding is with a gas comprising hydrogen sulfide and hydrogen.

3. The process of claim 1, wherein less than 90% of the water in the slurry is maintained in the liquid phase.

4. The process of claim 1, wherein less than 70% of the water in the slurry is maintained in the liquid phase.

5. The process of claim 1, wherein at least 50% of the water in the slurry is maintained in the liquid phase.

6. The process of claim 1, wherein the slurry of step (c) is mixed under turbulent mixing condition with at least a hydrocarbon oil and hydrogen gas.

7. The process of claim 1, wherein the slurry of step (c) is mixed under sufficient turbulent mixing condition for a Reynolds number of at least 2000.

8. The process of claim 7, wherein the slurry of step (c) is mixed under sufficient turbulent mixing condition for a Reynolds number of at least 3000.

9. The process of claim 1, further comprising the step of removing water from the catalyst composition in a separator.

10. The process of claim 1, wherein the forming of the active catalyst composition admixed with a liquid hydrocarbon is under a temperature of 300° F. to 600° F. and a pressure ranging from about 100 psig to about 3000 psig.

11. The process of claim 1, wherein the forming of the active catalyst composition occurs in two reaction zones, wherein the slurry of step (c) is first mixed with the at least a hydrocarbon oil in a first reaction zone to form and maintain a homogenous slurry; and the homogenous slurry is subsequently mixed with hydrogen gas in a second reaction zone to form the active catalyst composition.

12. The process of claim 11, wherein conditions in the first reaction zone comprise a temperature in the range from at least about 80° F. to about 200° F., and a pressure in the range from at least about 100 psig to about 3000 psig.

13. The process of claim 12, wherein conditions in the first reaction zone comprise a temperature in the range from at least about 130° F. to about 160° F. and a pressure in the range from at least about 300 psig to about 500 psig.

14. The process of claim 11, wherein the conditions of the second reaction zone comprise a temperature in the range from at least about 350° F. to about 600° F. and a pressure in the range from at least about 100 psig to about 3000 psig.

15. The process of claim 14, wherein the conditions of the second reaction zone comprise a temperature in the range from at least about 350° F. to about 600° F. and the pressure in the range from at least about 200 psig to about 1000 psig.

16. The process of claim 1, wherein the hydrocarbon oil viscosity ranges from at least about 2 cSt @ 212° F. to about 15 cSt @ 212° F.

17. The process of claim 1, wherein the Group VIII metal compound of step (c) is selected from the group consisting of nickel sulfates and cobalt sulfates.

18. The process of claim 1, wherein the group VIB metal compound is molybdenum oxide.

19. The process of claim 1, wherein the group VIB metal compound is molybdenum oxide, the Group VIII metal compound is a nickel compound, and the weight ratio of nickel to molybdenum ranges from 1:100 to about 1:2.

20. The process of claim 1, wherein the group VIB metal compound and the group VIII metal compound are present in an amount ranging from 9:1-1:9 molar ratio of Group VI metal to Group VIII metal.

21. The process of claim 1, wherein the at least a hydrocarbon oil is a vacuum gas oil.

22. The process of claim 21, which is continuously mixed in a storage tank to maintain homogenous slurry.

23. The process of claim 1, wherein the steps (a) to (d) are carried out sequentially in a plurality of tanks.

24. The process of claim 1, wherein steps (a) to (d) are carried out sequentially in one single tank.

25. The process of claim 1, wherein some of the steps from (a) to (d) are carried out concurrently in one single tank.

26. The process of claim 1, wherein the catalyst has an HDN conversion rate of at least 90%.

27. The process of claim 1, wherein the catalyst has an HDS conversion rate of at least 90%.

28. A process for preparing a catalyst composition suitable for the hydroconversion of heavy oils, comprising: (a) mixing a group VIB metal compound with aqueous ammonia,(b) sulfiding the mixture of (a) with hydrogen and hydrogen sulfide to form a group VIB metal catalyst precursor in an aqueous slurry;(c) promoting the slurry with a Group VIII metal compound;(c) mixing under turbulent mixing conditions the slurry of step (c) with hydrogen gas and at least a hydrocarbon oil having a viscosity of at least 2 cSt @ 212° F. to form a homogenous slurry, and under sufficient temperature and pressure to maintain at least a portion of water in the slurry in a liquid phase, thereby forming an active catalyst composition admixed with a liquid hydrocarbon comprising slurry catalyst having an average particle size in the range of 1-20 microns.

29. A process for preparing a catalyst composition suitable for the hydroconversion of heavy oils, comprising:(a) mixing a group VIII metal compound with aqueous ammonia,(b) adding hydrogen, hydrogen sulfide and a Group VIII metal compound to the mixture of step (a), forming a catalyst precursor in slurry;(c) mixing under turbulent mixing conditions the slurry of step (b) with hydrogen gas and at least a hydrocarbon oil having a viscosity of at least 2 cSt @ 212° F. to form a homogenous slurry, and under sufficient temperature and pressure to maintain at least a portion of water in the slurry in a liquid phase, thereby forming an active catalyst composition admixed with a liquid hydrocarbon comprising slurry catalyst having an average particle size in the range of 1-20 microns.

30. The process of claim 29, wherein the group VIB metal compound is molybdenum oxide.

31. The process of claim 29, wherein the Group VIII metal compound is a nickel compound.

32. The process of claim 29, wherein the group VIB metal compound and the group VIII metal compound are present in an amount ranging from 9:1-1:9 molar ratio of Group VI metal to Group VIII metal.

* * * * *